United States Patent [19]

Suzuki et al.

[11] 3,953,649

[45] Apr. 27, 1976

[54] SELF-BONDING MAGNET WIRE AND PROCESS OF MANUFACTURING SAME

[75] Inventors: Kazuo Suzuki; Yoshiaki Hayashi; Seiichi Nagamine, all of Otu, Japan

[73] Assignee: Kanegafuchi Kagaku Kogyo Kabushiki Kaisha, Osaka, Japan

[22] Filed: Oct. 17, 1974

[21] Appl. No.: 515,506

Related U.S. Application Data

[63] Continuation-in-part of Ser. No. 388,328, Aug. 12, 1973, abandoned.

[30] Foreign Application Priority Data

Aug. 14, 1973 Japan .............................. 48-81565

[52] U.S. Cl. ........................ 428/383; 260/85.7 TW; 427/117; 427/118; 427/120; 427/388; 428/379; 428/458; 428/474

[51] Int. Cl.[2] ...................... H01B 3/30; C08G 69/00

[58] Field of Search ........... 427/117, 118, 120, 388; 428/379, 383, 458, 474; 260/85.7 TW

[56] References Cited

UNITED STATES PATENTS

| | | | |
|---|---|---|---|
| 3,022,200 | 2/1962 | Koerner et al. | 428/383 |
| 3,105,775 | 10/1963 | Lavin et al. | 427/120 X |
| 3,354,127 | 11/1967 | Hill et al. | 260/78 R |
| 3,877,966 | 4/1975 | Goyffon | 427/118 |
| R27,939 | 3/1974 | Raabe | 260/78 A X |

*Primary Examiner*—Ralph Husack
*Attorney, Agent, or Firm*—Moonray Kojima

[57] ABSTRACT

A self-bonding magnet wire comprising a conductor with a coating thereon, said coating comprising 65 to 95 parts by weight of a copolyamide containing 10 to 50 weight percent ω-laurolactam, 35 to 5 parts by weight of a copolyamide containing 70 to 90 weight percent of ω-laurolactam, and 5 to 25 parts by weight of a thermoplastic linear polyhydroxypolyetherester resin and process of manufacturing same.

8 Claims, No Drawings

SELF-BONDING MAGNET WIRE AND PROCESS OF MANUFACTURING SAME

BACKGROUND OF THE INVENTION

This application is a continuation in part of Ser. No. 388,328 filed 8/12/73, now abandoned.

This invention relates to a self-bonding magnet wire and process of manufacturing same.

Self bonding magnet wires are used to manufacture, for example, deflecting coils for television sets. Heating is by means of electric current supplied therethrough. It is desired to make such a coil having small thermal deformation with increase of the deflecting angle.

Prior self bonding magnet wires, used for such purpose, are deficient in many respects, such as blocking of the magnet wire on a bobbin, thermal deformation, hygroscopic caused deformation, lack of spring back, and resulting inferiority of convergence in a television set.

SUMMARY OF THE INVENTION

After extensive experiments, the inventors have discovered a coating for conductors which would be useful as a self bonding magnet wire with such advantageous properties as: the self bonding layer does not produce blockings of magnet wire on the bobbin; thermal deformation of a coil prepared from it is small; and deformation of the coil due to hygroscopic properties of copolyamide and due to spring back are small.

The coating comprises three components (A) 65 to 35 parts by weight of a copolyamide containing 10 to 50 weight percent of ω-laurolactam, 20 to 35 weight percent ε-caprolactam, 15 to 25 weight percent hexamethylene diammonium adipate, and 5 to 35 weight percent hexamethylene diammonium sebacate; (B) 35 to 5 parts by weight of a copolyamide containing 70 to 90 percent by weight of ω-laurolactam and (C) 5 to 25 parts by weight of polyhydroxypolyetherester resin. The coating may be applied to a copper conductor or wire previously enamelled witth synthetic resin.

DETAILED DESCRIPTION OF PREFERRED EMBODIMENTS

The first copolyamide (A) may be obtained by polymerization of a mixture containing 10 to 50 weight percent ω-laurolactam, 15 to 25 weight percent hexamethylene diammonium adipate, 20 to 35 weight percent ε-caprolactam and 5 to 35 weight percent hexamethylene diammonium sebacate. These are preferred ratios, but for other purposes other ratios may be used within the context of the invention provided the 10 to 50 percent ω-laurolactam is retained. Ordinarily the relative viscosity $\eta_r$ (hereinafter referred to as $\eta_r$; measured in 1% solution of m-cresol at 25°C) of the copolymer, may be within the range of from 2.5 to 4.0. Polymers of a higher viscosity, that is of higher average molecular weight, are more desirable. Use of above 95 parts by weight or below 65 parts by weight of the first copolyamide (A) results in disadvantageous properties of the self-bonding coating.

The second copolyamide (B) may be obtained by the polymerization of a mixture containing 70 to 90 weight percent ω-laurolactam and remainder ε-caprolactam. In some cases part of the ε-caprolactam may be substituted with more than trace amounts of hexamethylene diammonium adipate and hexamethylene diammonium sebacate. Ordinarily the relative viscosity of the second polymer may range from 2.6 to 3.0.

If more than 35 parts by weight of the second copolymer to the total copolyamide is used, the melting point of the self-bonding layer on copper wire becomes so high that the layer does not self-bond to the copper when heated by electric current passing through the coil. Less than 5 parts by weight also produces disadvantages.

If these first and second copolymers are used singly, each produces blockings of magnet wire on the bobbin or it is impossible to form coils therewith.

The polyhydroxypolyetherester resin which may be used as a component of the coating, may be a thermoplastic, linear polymer having a film-forming property and having 40,000 to 50,000 average molecular weight. It may be obtained from the reaction of methyl-substituted diepoxide and dicarboxylic acid. In the reaction, though it generates the tertiary hydroxy-group in a molecule, the hydroxy-group reacts as glycol and is inactive for dehydroesterification with a carboxylic acid. Therefore, in spite of existence of so many teriary hydroxy-groups in a growing molecule, the reaction occurs as if a two functional polymerization and results in a linear high polymer. If non-methyl substituted diepoxide is selected as a reactant, it generates the secondary hydroxy-group. The secondary hydroxy-group reacts rather easily with a carboxylic group, resulting in dehydroesterification and gelation of three dimensional polymer molecules. In other words, the diepoxide reacts as a polyol and exhibits a big difference from the methyl substituted one.

Use of less than 5 parts by weight of polyhydrooxyeltherester resin results in blocking of magnet wire on a bobbin. In case of more than 25 parts by weight, the three components of the coating or varnish become incompatible and the appearance of the coated resin becomes rough and matted.

Each component is separately dissolved in a suitable solvent, such as m-cresol, and then homogeneously mixed together after the respective separate dissolutions. The mixing may be done in any suitable manner. The prepared coating mixture or varnish is coated on a copper conductor or wire, or any other suitable conductor. The conductor may have been previously enamelled or coated with a synthetic resin, such as polyester, polyesterimide, polyamideimide, polyimide, polyvinyl formal, and mixture thereof. After the coating with the mixture or varnish, the conductor so coated is baked in a furnace at a temperature within the range of 250°C to 400°C; with an insulated wire being thus obtained. Using the resulting self-bonding magnet wire, it is possible to form a coil with heating by means of an electric current applied therethrough.

Further detailed descriptions are illustrative with the following actual examples.

EXAMPLE 1.

Each of the following components was separately dissolved in a respective suitable solvent m-cresol: 80 parts by weight of copolyamide (1) which was a copolymer of 20 weight percent ω-laurolactam, 15 weight percent hexamethylene diammonium adipate; 35 weight percent ε-caprolactam and 30 weight percent hexamethylene diammonium sebacate with the $\eta_r$ being 2.7; 20 parts by weight of copolyamide (2) which was a copolymer of 80 weight percent ω-laurolactam, and remainder ε-caprolactam with the $\eta_r$ being 2.8;

and 25 parts by weight of thermoplastic linear polyhydroxypolyetherester resin (3) of 50,000 average molecular weight. Thereafter, the separate solutions were homogeneously mixed together. The mixture varnish was coated on a copper wire of 0.4 mm diameter. The wire was previously enameled with polyester. Thereafter, the coated wire was baked at 300°C in a furnace at a linear speed of 5 m/min. A self-bonding magnet wire was thus produced.

No blocking was observed of the prepared magnetic wire on a bobbin after standing for one week at 40°C in a thermostat. The thermal deformation of a coil formed from the wire was observed as a small value of about 0.13 mm, at 90°C in a thermostat.

Next, the deformation due to spring back was tested by standing the coil for one hour after forming, at room temperature (relative humidity: 63%). Observed was a small value of 0.48 mm. Again, standing the sample for 24 hours at room temperature (relative humidity: 100%) the observed deformation due to hygroscopic property of copolyamide was also small, being 0.2 mm.

Against these results, excluding the second copolyamide (2) from the mixture varnish, the deformation of the obtained coil becomes considerably large. For example, when 100 parts by weight of the first copolyamide (1) and 25 parts by weight of the polymer (3) were used alone for the varnish, although blocking of the obtained magnet wire was small, the thermal deformation of the prepared coil was small, about 0.18 mm, and the deformation due to hygroscopic property of resin was also small, about 0.15 mm, and the deformation due to spring back was large, about 1.07 mm. Thus, it was necessary to cool the metallic bobbin for winding a coil.

EXAMPLE 2.

A self bonding magnet wire was prepared in the same manner as in Example 1, except the composition of the inventive varnish was changed. The composition was 90 parts by weight of a copolyamide (1) which was a copolymer of 20 weight percent ω-laurolactam, 15% by weight hexamethylene diammonium adipate, 35 weight percent ε-caprolactam, and 30 weight percent hexamethylene diammonium sebacate with $\eta_r$ being 3.6; 10 parts by weight of copolyamide (2) which was a copolymer of 80 weight percent ω-laurolactam and remainder ε-caprolactam with $\eta_r$ being 2.8; and 25 parts by weight of a thermoplastic linear polyhydroxypolyetherester resin of 40,000 average molecular weight.

For the self bonding magnet wire thus obtained, the blocking of the magnet wire on the bobbin was nil, thermal deformation of the coil prepared therefrom was small, about 0.12 mm; deformation of the coil due to spring back was small, about 0.33 mm; and the deformation due to hygroscopic property of the resin was also small, about 0.20 mm.

EXAMPLE 3.

A self bonding magnet wire was prepared in the same manner as in Example 1, except the composition of the inventive varnish was changed. The composition was 90 parts by weight of a copolyamide (1) which was a copolymer of 10% by weight ω-laurolactam, 35 weight percent hexamethylene diammonium sebacate, 35 weight percent ε-caprolactam, and 20 weight percent hexamethylene diammonium adipate with $\eta_r$ being 2.9; 10 parts by weight of copolyamide (2) which was a copolymer of 80 weight percent ω-laurolactam and remainder ε-caprolactam with $\eta_r$ being 2.8 and 20 parts by weight of a thermoplastic linear polyoxypolyetherester resin of 40,000 average molecular weight.

For the self-bonding magnet wire thus attained, the blocking of the magnet wire on the bobbin was nil; thermal deformation of a coil prepared therefrom was small, about 0.25 mm; deformation of the coil due to spring back was small, about 0.5 mm; and the deformation due to hygroscopic property of the resin was also small, about 0.25 mm.

EXAMPLE 4.

A self bonding magnet wire was prepared in the same manner as in Example 1, except the composition of the inventive varnish was changed. The composition was 70 parts by weight of a copolyamide (1) which was a copolymer of 50 weight percent ω-laurolactam, 25 weight percent hexamethylene diammonium adipate, 20 weight percent ε-caprolactam and 5 weight percent hexamethylene diammonium sebacate with $\eta_r$ being 3.5; 30 parts by weight of copolyamide (2) which was a copolymer of 80 weight percent ω-laurolactam and remainder ε-caprolatam with $\eta_r$ being 2.8; and 5 parts by weight of a thermoplastic linear polyhdroxypolyetherester resin of 40,000 average molecular weight.

For the self bonding magnet wire thus obtained, the blocking of the magnet wire on a bobbin was nil, thermal deformation of a coil prepared therefrom was small, about 0.11 mm; deformation of the coil due to spring back was small, about 0.28 mm; and the deformation due to hygroscopic property of the resin was also small, about 0.10 mm.

Against these results, in the above experiment, when we used the copolymer of ω-laurolactam and ε-caprolactam as the components of the varnish, in place of the copolyamide (1) wherein the content of ω-laurolactam was 60 percent by weight and $\eta_r$ was 2.8, the melting point of the self bonding layer on a copper wire became so high as the degree of self bonding of the layer was inferior when heating by electric current passed through the wire. It was not possible to form a suitable coil.

EXAMPLE 5.

A self bonding magnet wire was prepared in the same manner as in Example 1, except the composition of the inventive varnish was changed. The composition was 80 parts by weight of a copolyamide (1) which was a copolymer of 20 weight percent ω-laurolactam, 15 weight percent hexamethylene diammonium adipate, 35 weight percent ε-caprolactam and 30 weight percent hexamethylene diammonium sebacate with $\eta_r$ being 2.7; 20 parts by weight of copolyamide (2) which was a copolymer of 70 weight percent ω-laurolactam and remainder ε-caprolactam with $\eta_r$ being 2.9 and 20 parts by weight of a thermoplastic linear polyhydroxypolyetherester resin of 40,000 average molecular weight.

For the self bonding magnet wire thus obtained, the blocking of the magnet wire on a bobbin was nil; thermo deformation of a coil prepared therefrom was small, about 0.18 mm; deformation of the coil due to spring back was small, about 0.51 mm; and the deformation due to hygroscopic property of the resin was also small, about 0.20 mm.

EXAMPLE 6.

A self bonding magnet wire was prepared in the same manner as in Example 1, except the composition of the inventive varnish was changed. The composition was 95 parts by weight of a copolyamide (1) which was a copolymer of 20 weight percent ω-laurolactam, 15 weight percent hexamethylene diammonium adipate, 35 weight percent ε-caprolactam and 30 weight percent hexamethylene diammonium sebacate with $\eta_r$ being 3.6; 5 parts by weight of copolyamide (2) which was a copolymer of 90 weight percent ω-laurolactam and remainder ε-caprolactam with $\eta_r$ being 2.8; and 25 parts by weight of a thermoplastic linear polyhydroxypolyetherester resin of 40,000 average molecular weight.

For the self bonding magnet wire thus obtained, the blocking of the magnet wire on a bobbin was nil; thermal deformation of a coil prepared therefrom was small, about 0.32 mm; the deformation of the coil due to spring back was small, about 0.40 mm; and the deformation due to hygroscopic property of the resin was small, about 0.30 mm.

The foregoing description is intended to be illustrative of the principles of the invention. Numerous modifications and variations thereof would be apparent to the worker skilled in the art. All such modifications and variations are to be considered to be within the spirit and scope of this invention.

What is claimed is:

1. A self bonding magnet wire comprising a conductor with a coating thereon, said coating comprising A. 65 to 95 parts by weight of a first copolyamide comprising 10 to 50 weight ω-laurolactam, 20 to 35 weight percent ε-caprolactam, 15 to 25 weight percent hexamethylene diammonium adipate and 5 to 35 weight percent hexamethylene diammonium sebacate;

B. 35 to 5 parts by weight of a second copolyamide comprising 70 to 90 weight percent ω-laurolactam, and the remainder ε-caprolactam; and C. 5 to 25 parts by weight polyhydroxypolyetherester resin.

2. Wire of claim 1, wherein further comprising a first layer of synthetic resin next adjacent said conductor and underneath said coating, said synthetic resin being selected from the group consisting of polyester, polyesterimide, polyamideimide, polyimide and polyvinyl formal, and mixtures thereof.

3. Wire of claim 1, wherein said first copolyamide has a relative viscosity of between 2.5 to 4.0.

4. Wire of claim 1, wherein said second copolyamide has a relative viscosity of 2.6 to 3.0.

5. Wire of claim 1, wherein said polyhydroxypolyetherester resin is a linear thermoplastic polymer having a film forming property and is between 40,000 and 50,000 average molecular weight and is obtained from reaction of methyl substituted diepoxide and a dicarboxylic acid.

6. Process of manufacturing a self bonding magnet wire comprising the steps of A. polymerizing a mixture of 10 to 50 weight percent ω-laurolactam, 15 to 25 weight percent hexamethylene diammonium adipate, 20 to 35 weight percent ε-caprolactam and 5 to 35 weight percent hexamethylene diammonium sebacate to produce a copolyamide having a relative viscosity of between 2.5 to 4.0;

B. polymerizing a mixture of 70 to 90 weight percent ω-laurolactam, and the remainder ε-caprolactam to produce a copolyamide having a relative viscosity of between 2.6 and 3.0;

C. reacting methyl substituted diepoxide and a dicarboxylic acid to produce a polyhydroxypolyetherester resin having an average molecular weight of between 40,000 and 50,000;

D. dissolving in a suitable solvent 65 to 95 parts by weight of said copolyamide of step A hereinabove;

E. dissolving in a suitable solvent 35 to 5 parts by weight of said copolyamide of step B hereinabove;

F. dissolving in a suitable solvent 5 to 25 parts by weight of said polyhydroxypolyetherester resin of step C hereinabove;

G. mixing together the solutions of steps D,E and F hereinabove;

H. coating a conductor with said mixture of step G hereinabove;

I. and baking said coated conductor at a temperature of between 250°C and 400°C.

7. Process of claim 6, wherein said conductor is first coated with a synthetic resin selected from the group consisting of polyester, polyesterimide, polyamideimide, polyimide and polyvinyl formal, and mixtures thereof, prior to said coating with said mixture.

8. Process of claim 6, wherein said copolyamide of step A has a relative viscosity of 2.7 to 3.6 and is dissolved in m-cresol in an amount of 80 to 90 parts by weight; wherein said copolyamide of step B has a relative viscosity of 2.8 to 2.9 and is dissolved in m-cresol in an amount of from 10 to 20 parts by weight; and wherein said polyhydroxypolyetherester resin has an average molecular weight of 40,000 and is dissolved in m-cresol in an amount of 25 parts by weight; and wherein said coating is heated at a temperature of 300°C at a linear speed of 5 m/min.

* * * * *